United States Patent
Brother et al.

(10) Patent No.: US 6,756,426 B2
(45) Date of Patent: Jun. 29, 2004

(54) LIGHTWEIGHT COMPOSITE MATERIAL FOR PROTECTIVE PADS, CUSHIONS, SUPPORTS OR THE LIKE AND METHOD

(75) Inventors: Theodore B. Brother, Andover, MA (US); Edward J. Ellis, Lynnfield, MA (US)

(73) Assignee: I-Tek, Inc., Lawrence, MA (US)

( * ) Notice: Subject to any disclaimer, the term of this patent is extended or adjusted under 35 U.S.C. 154(b) by 0 days.

(21) Appl. No.: 10/306,587

(22) Filed: Nov. 27, 2002

(65) Prior Publication Data

US 2003/0153669 A1 Aug. 14, 2003

Related U.S. Application Data

(60) Provisional application No. 60/342,664, filed on Dec. 20, 2001.

(51) Int. Cl.$^7$ .................................................. C08J 9/32
(52) U.S. Cl. ..................... 523/218; 521/55; 523/219; 106/122; 106/DIG. 2; 252/378 P; 252/304
(58) Field of Search ................. 523/218, 219; 521/55; 106/122; 252/378 P, 304

(56) References Cited

U.S. PATENT DOCUMENTS

| | | | |
|---|---|---|---|
| 3,529,368 A | 9/1970 | Canfield | 36/2.5 |
| 3,748,669 A | 7/1973 | Warner | 5/348 WB |
| 3,986,213 A | 10/1976 | Lynch | 3/36 |
| 4,038,762 A | 8/1977 | Swan, Jr. | 36/89 |
| 4,229,546 A | 10/1980 | Swan, Jr. | 521/55 |
| 4,252,910 A | 2/1981 | Schaefer | 521/145 |
| 4,728,551 A | 3/1988 | Jay | 428/76 |
| 4,952,439 A | 8/1990 | Hanson | 428/72 |
| 5,058,291 A | 10/1991 | Hanson | 36/117 |
| 5,093,138 A | 3/1992 | Drew et al. | 426/68 |
| 5,100,712 A | 3/1992 | Drew et al. | 428/68 |
| 5,147,685 A | 9/1992 | Hanson | 428/189 |
| 5,204,154 A | 4/1993 | Drew et al. | 428/68 |
| 5,362,543 A | 11/1994 | Nickerson | 428/76 |
| 5,421,874 A | 6/1995 | Pearce | 106/122 |
| 5,432,000 A | 7/1995 | Young, Sr. et al. | 428/372 |
| 5,501,659 A | 3/1996 | Morris et al. | 602/27 |
| 5,549,743 A | 8/1996 | Pearce | 106/122 |
| 5,596,770 A | 1/1997 | Kunesh | 2/239 |
| 5,625,896 A | 5/1997 | LaBarbera et al. | 2/22 |
| 5,626,657 A | 5/1997 | Pearce | 106/122 |
| 5,833,639 A | 11/1998 | Nunes et al. | 602/23 |
| 5,869,164 A | 2/1999 | Nickerson et al. | 428/76 |
| 6,020,055 A | 2/2000 | Pearce | 428/323 |
| 6,026,527 A | 2/2000 | Pearce | 5/654 |
| 6,485,446 B1 | 11/2002 | Brother et al. | 602/20 |

Primary Examiner—Morton Foelak
(74) Attorney, Agent, or Firm—Nields & Lemack

(57) ABSTRACT

An improved material for use in resilient conforming pads, cushions, impact resistance padding and the like is described. The material comprises a liquid or semi-solid matrix phase and an expanded Perlite included phase. The material is useful for providing low weight contour conforming resilent padding for garments, athletic equipment, prosthetic devices, surgical, medical or vehicular cushions, positioning devices, mattresses, impact protective padding and the like.

3 Claims, 2 Drawing Sheets

LIGHTWEIGHT COMPOSITE MATERIAL FOR PROTECTIVE PADS, CUSHIONS, SUPPORTS OR THE LIKE AND METHOD

This application claims priority of Provisional Application Serial No. 60/342,664 filed on Dec. 20, 2001, the disclosure of which is hereby incorporated by reference.

BACKGROUND OF THE INVENTION

A wide variety of compositions have been developed for use in seats, cushions mattresses, therapeutic and non-therapeutic fitted pads, hot and/or cold pain relief packs, mattress overlays, athletic equipment (including impact absorbing materials), surgical surfaces, prosthetic devices and similar apparatus which are placed in contact with the human body. Such compositions provide form support, comfort and protection because they have the ability to deform in response to continuously applied pressure or the ability to absorb significant amounts of energy from rapidly applied pressure (impact). In addition, it is a desirable feature for these compositions to be lightweight. This can be achieved to some degree by employing foams or composite materials.

A review of the prior art reveals many examples of materials for use in cushioning and padding applications. These materials generally fall into one or two categories: conventional foams and viscous liquids.

Foams offer the advantages of low cost, lightweight and the ability to exhibit a wide variety of physical properties such as: flexible to rigid, instantaneous or delayed recovery and closed or open cell (breath ability). On the other hand, foams do not flow and therefore are not pressure compensating. In addition, foams do not dissipate energy in impact situations.

Viscous liquids may be either water based or oil based. Generally water based systems are produced by dissolving a water-soluble polymer to increase the viscosity to produce a thick flowable liquid or a gel. While these systems offer pressure compensation in applications such as conforming cushions, they have a specific gravity of about 1.0 versus foams which can be produced with specific gravity of 0.2 or less. Water based systems, when used in cushioning applications, must be protected against evaporation, freezing and microbial growth. Use of an oil-based system overcomes the deficiencies noted for water-based systems. Examples of oil-based materials would include silicon oils, hydrocarbon oils, mineral oil and synthetic polymers such a polyamides and polyglycols. The useful viscosity range for these oils range from about 1,000 to up to 1,000,000 centipoise, depending on the application and the other components that are utilized in the formulation.

U.S. patents to Terrence M. Drew et al. issued Mar. 3, 1992 (U.S. Pat. No. 5,093,138) and Mar. 31, 1992 (U.S. Pat. No. 5,100,712) describe a flowable, pressure compensating composition including water, a material for increasing the viscosity of water, and spherical particles dispersed throughout the volume of the water. The composition disclosed in these patents is a deformable fluid that has the disadvantages of substantial weight, memory, and being slow to flow or shear in response to a deforming pressure.

U.S. patents to Chris A. Hanson issued Oct. 22, 1991 (U.S. Pat. No. 5,058.291) and Aug. 28, 1990 (U.S. Pat. No. 4,952,439) describe padding devices, which are resistant to flow in response to an instantly applied pressure. The composition of the padding material is a combination of wax and discrete particles, including microspheres. The padding disclosed in these patents has the disadvantage of being slow to flow in response to pressure, thus having a high shearing force. The materials disclosed in these patents also have memory, causing them to tend to return to their original shape after removal of a deforming pressure. Memory is described in U.S. patents to Chris A. Hanson issued Sep. 15, 1992, (U.S. Pat. No. 5,147,685), Terrence M. Drew issued Apr. 20, 1993 (U.S. Pat. No. 5,204,154), Chris A. Hanson issued Aug. 28, 1990 (U.S. Pat. No. 4,952,439), Thomas F. Canfield issued Sep. 22, 1970 (U.S. Pat. No. 3,529,368), Terrence M. Drew et al. issued Mar. 3, 1992 (U.S. Pat. No. 5,093,138), Chris A. Hanson issued Oct. 22, 1991 (U.S. Pat. No. 5,058,291) and Terrence M. Drew, et al. issued Mar. 31, 1992 (U.S. Pat. No. 5,100,712)

U.S. patents to Eric C. Jay issued Mar. 1, 1988, (U.S. Pat. No. 4,728,551), Jack C. Swan, Jr. issued Jan. 6, 1981 (U.S. Pat. No. 4,229,546), Jack C. Swan, Jr. issued Jan. 6, 1981 (U.S. Pat. No. 4,038,7620), Henry Wilfred Lynch issued Oct. 19, 1976 (U.S. Pat. No. 3,986,213) and Frederick L. Warner issued Jul. 31, 1973 (U.S. Pat. No. 3,748,669), disclose pressure-compensating mixtures, which are generally characterized by having a quantity of micro beads dispersed in a flowable liquid medium. Disadvantages of such mixtures include their weight, head pressure and memory. The liquid described in those patents is formulated for certain flow characteristics and the micro beads are merely added because of their low specific gravity to reduce the total weight of the mixture. The resulting mixture is still very heavy because the light micro beads are not used to replace a substantial amount of the heavy liquid, but are instead used only to provide a slight weight reduction of the mixture compared to the use of a liquid alone.

U.S. patents to Tony M. Pearce issued Jun. 6, 1995 (U.S. Pat. No. 5,421,874), Aug. 27, 1996 (U.S. Pat. No. 5,549,743), May 6, 1997 (U.S. Pat. No. 5,626,657), Feb., 1, 2000 (U.S. Pat. No. 6,020,055), describe a composite mixture of spherical objects and lubricant useful for its cushioning properties. The composite may be composed of microspheres and any of a variety of lubricants that involves sliding and rolling contact of the spherical particles with respect to each other. This creates a situation where interactions between spherical particles are avoided. The result is the inability to transfer localized loading through out the composite material and can lead to "bottoming out" of the cushion or padding device.

U.S. patent to Lincoln P. Nickerson, issued Nov. 8, 1994 (U.S. Pat. No. 5,362,543), describes a composite composition comprising a silicone fluid with an amide thickener filled with glass or phenolic micro-spheres. Their compositions are particularly characterized by their ability to flow in response to a continuously applied pressure, yet to maintain their shape and position in the absence of applied pressure.

The use of block copolymers in padding and cushioning compositions is described in U.S. patents issued to Tony M. Pearce, issued Feb. 22, 2000 (U.S. Pat. No. 6,026,527), and to Lincoln P. Nickerson issued Feb. 9, 1999 (U.S. Pat. No. 5,869,164). These patents disclose the use of ABA type block copolymers, generally composed of one block of polystyrene and the other block of a soft rubber like elastomer. The addition of these block copolymers to oil based vehicles results in a thixotropic fluid. Microspheres are utilized to lower the density of these compositions.

U.S. patent to Philip Schaefer, issued Feb. 24, 1981 (U.S. Pat. No. 4,252,910) describes a material for use in resilient conforming pads, cushions and the like. The material comprises plastic micro-spheres cohered to a mass by what he terms a thermoplastic "bonding agent". The "bonding agent" is a polybutene polymer in the molecular weight range of 3,000 to 7,500. Given this relatively narrow molecular weight range the visco-elastic properties of the Schaefer compositions are rather limited. In fact Schaefer states that the bonding agent is flowable plastic at about, or slightly higher than body temperature. Given these conditions and restrictions the Schaefer invention is quite limited in its scope.

SUMMARY OF THE INVENTION

The present invention is directed to improved, lightweight compositions for padding and cushioning devices. These compositions comprise two components: a liquid or semi-solid vehicle/matrix phase and a low density included phase. It is an important aspect of this invention that the vehicle/matrix phase is bonded or adhered to the low density included phase, in order to provide a means of attaining improved response and distribution of mechanical loads. In addition, improved bonding or adhesion also provides for better dispersion of the novel low density included phase and as a result, better stability of the composition, that is, better resistance to separation of the included phase from the continuous vehicle/matrix phase.

A variety of liquids or semi-solids can be utilized as the vehicle/matrix phase and include:

i. Aqueous based fluids,
ii. Hydrophilic fluids,
iii. Hydrophobic fluids,
iv. Silicone based fluids.

Aqueous based fluids consist of water plus a viscosifier or thickener to adjust the rheology of the vehicle phase. Hydrophilic fluids are low to medium molecular weight materials and polymers that are liquids or semi-solids. The preferred hydrophilic fluids are the polyglycols. Hydrophobic fluids are low to medium molecular weight hydrocarbon containing liquids or semi-solids. A variety of paraffinic fluids can be utilized as the vehicle phase. The preferred paraffinic fluids are saturated polyalphaolefins, mineral oils and polybutene fluids including, polyisobutylene and poly-1-butene. Silicone fluids are low to medium molecular weight polydimethylsiloxane polymers and co-polymers.

The included phase serves to lower the density of the composite material. The low-density filler of this invention is an expanded Perlite consisting of sodium potassium aluminum silicate. The density of the expanded Perlite ranges from about 0.18 gm/cm$^3$ to about 0.30 gm/cm$^3$ and the particle size ranges from about 1 micron to 300 microns.

The compositions of this invention are prepared by mixing the expanded Perlite, under low shear conditions, into the prepared vehicle/matrix phase. Other additives may be employed to confer specific characteristics to the composition.

The compositions of the present invention are especially useful as filling materials for deformable, pressure compensating padding devices comprising a flexible protective envelope having a cavity which contains the composition and which envelope has structure that allows the composition to deform in the cavity in response to a continuously applied load upon said envelope, but to maintain position in the absence of pressure.

In the case where the applied load is instantaneous, such as in impact, said envelope deforms minimally and the transferred energy is effectively dissipated by the contained composition. The compositions of the present invention are particularly characterized by their:

1. Ability to deform by flowing in response to a continuously applied pressure.
2. Ability to dissipate or absorb the kinetic energy that results from an impact event.
3. Tendency to maintain shape and position in the absence of an applied pressure.
4. Lack of resiliency, under loading normally associated with materials such foams or elastomers.
5. Minor changes in viscosity when subjected to changes in temperature.
6. Resistance to phase separation of the vehicle and microsphere components.
7. Chemical compatibility with vinyl, polyurethane and polyolefin films.
8. Excellent biocompatibility that is non-poisonous and low probability of contact dermatitis.
9. Low potential for microbial growth.
10. Stable over time, that is, long shelf life.

DESCRIPTION OF PREFERRED EMBODIMENTS

Figure 1:
FIG. 1 is a magnified photograph of expanded Perlite in accordance with the present invention.

The composite materials of this invention are composed of at least two elements; a liquid or semi-solid vehicle or matrix phase and an expanded Perlite included phase.

The vehicle or matrix phase preferably has a viscosity from about 200 centipoise to about 20,000 centipoise. More preferably, the viscosity of the vehicle or matrix phase ranges from about 300 centipoise to about 7,500 centipoise. Various fluids may be utilized as the vehicle or matrix phase and include:

i. Aqueous based fluids,
ii. Hydrophilic fluids,
iii. Hydrophobic fluids,
iv. Silicone based fluids.

Aqueous based fluids consist of water plus a viscosifier or thickener to adjust the rheology, and more specifically, the viscosity, of the vehicle phase. A number of additives can be utilized to increase the viscosity of water based systems. Examples of such viscosifiers and thickeners include, but are not limited to:

Low molecular weight additives
i. Ethylene glycol,
ii. Diethylene glycol,
iii. Triethylene glycol,
iv. Propylene glycol,
v. Glycerin,
vi. Diglycerine,
vii. Polyglycerine
Polymeric viscosifiers:
i. Methyl cellulose,
ii. Hydroxyethyl cellulose,
iii. Hydroxypropylmethyl cellulose,
iv. Sodium carboxymethyl cellulose v. Modified cellulose,
vi. Homopolymers and copolymers of
  a. Acrylic acid
  b. Methacrylic acid
  c. Sodium acrylate
  d. Sodium methacrylate
  e. Acrylamide
  f. Styrene sulfonate
vii. Polyethylene glycol,
viii. Polyvinyl alcohol,
ix. Polyoxyethylene polyoxypropylene block copolymers
x. Cross linked polyacrylates known as "super absorbing polymers" including Carbopol® and Noveon®
xi. Natural products such as:
  a Acetan
  b. Gum agar-agar
  c. Alginates
  d. Gum Arabic
  e. Carrageenan
  f Furcellaran
  g. Ghatti
  h. Guar
  i. Gum tragacanth
  j. Karaya
  k. Locust bean
  l. Modified starches
  m. Starch
  n. Tamarine
  o. Xanthan
xii. Mineral thickeners such as attapolgite clay, fumed silica,
Bentonite®, Laponite® and Veegum®

Depending on the viscosifier or thickener chosen, and the viscosity level desired, the amount utilized can range from as little as 0.1% (for high molecular weight water soluble polymers) to 10% or greater (for mineral thickeners).

Hydrophilic fluids are low to medium molecular weight compounds that are utilized alone, or in combination, to produce a non-aqueous based vehicle. Examples of such hydrophilic organic compounds include, but are not limited to:
  i. Ethylene glycol,
  ii. Diethylene glycol,
  iii. Triethylene glycol,
  iv. Polyethylene glycol,
  v. Propylene glycol,
  vi. Polypropylene glycol,
  vii. Glycerin,
  viii. Diglycerin,
  ix. Polyglycerin,
  x. Butylene glycol,
  xi. Polybutylene glycol,
  xii. Polyoxyethylene/oxypropylene block copolymers.

Hydrophobic fluids are low to medium molecular weight hydrocarbon containing liquids or semi-solids. A variety of paraffinic fluids can be utilized as the vehicle or matrix phase. Examples of such materials include, but are not limited to:
  i. Polyalphaolefins,
  ii. Polyisobutylene,
  iii. Poly-1-butene,
  iv. Low molecular waxes,
  v. Mineral oils,
  vi. Vegetable oils,
  vii. Dialkylcarbonate oils,
  viii. Dialkylphithalates Silicone fluids that are utilized as the vehicle or matrix phase are low to medium molecular weight polydimethylsiloxane polymers and copolymers. Preferred polydimethylsiloxanes range in viscosity from about 200 centipoise to about 7,500 centipoise. Phenyl or flouro containing silicone fluids may also be utilized to impart unique properties such as heat/cold retention and solvent resistance.

The included phase serves to lower the density of the resulting composite material. Prior art composites utilize microspheres as the included phase. Most commonly, these microspheres are hollow spheres with diameters in the 1 to 500 micron range. Most commonly the diameters are 5 to 200 microns. The microsphere wall can be made of metal, glass, or plastic. Most common are the glass and plastic walled microspheres. The microspheres, as their name implies, are spherical in shape and exhibit, for any given diameter, a low surface to volume ratio. For this reason the contact area between the vehicle and the microsphere's surface is minimized. This results in minimum bonding between the mnicrosphere and the vehicle/matrix phase. In a cushioning application, this can result in poor distribution of an applied load and the generation of high pressure points. Minimum bonding between the vehicle/matrix phase and the microsphere can also lead to separation of the included phase.

The low-density included phase of the invention is distinctly superior to prior art microspheres in a number of features. The expanded Perlite of this invention is a micro cellular Perlite (glass) filler whose shapes vary to combine different geometries. These unique characteristics of expanded Perlite, as compared to hollow microspheres, include:

1. Irregular Shape—The expanded Perlite is irregular in shape and provides a greater tensile strength than the usual hollow microspheres. In addition, the surface to volume ratio of expanded Perlite is much greater than hollow microspheres, which allows the vehicle to bind or adhere more tenaciously to the particles resulting in improved mechanical properties and stability.

2. Multicellular—The shape of the expanded Perlite resembles clusters of micro-bubbles. If one surface of the expanded Perlite is broken, there are more cells in each particle to maintain structural integrity.

3. Strength—The aspect ratio of expanded Perlite contributes to improved strength and, at the same time, stresses are transmitted throughout the "particle" and provide a greater stress/impact distribution.

4. Cost—The cost of expanded Perlite compares very favorably to the cost of hollow microspheres. The performance enhancements expanded Perlite exhibits over hollow microspheres, coupled with its lower cost, make expanded Perlite a much higher value to cost choice.

Figure 2:
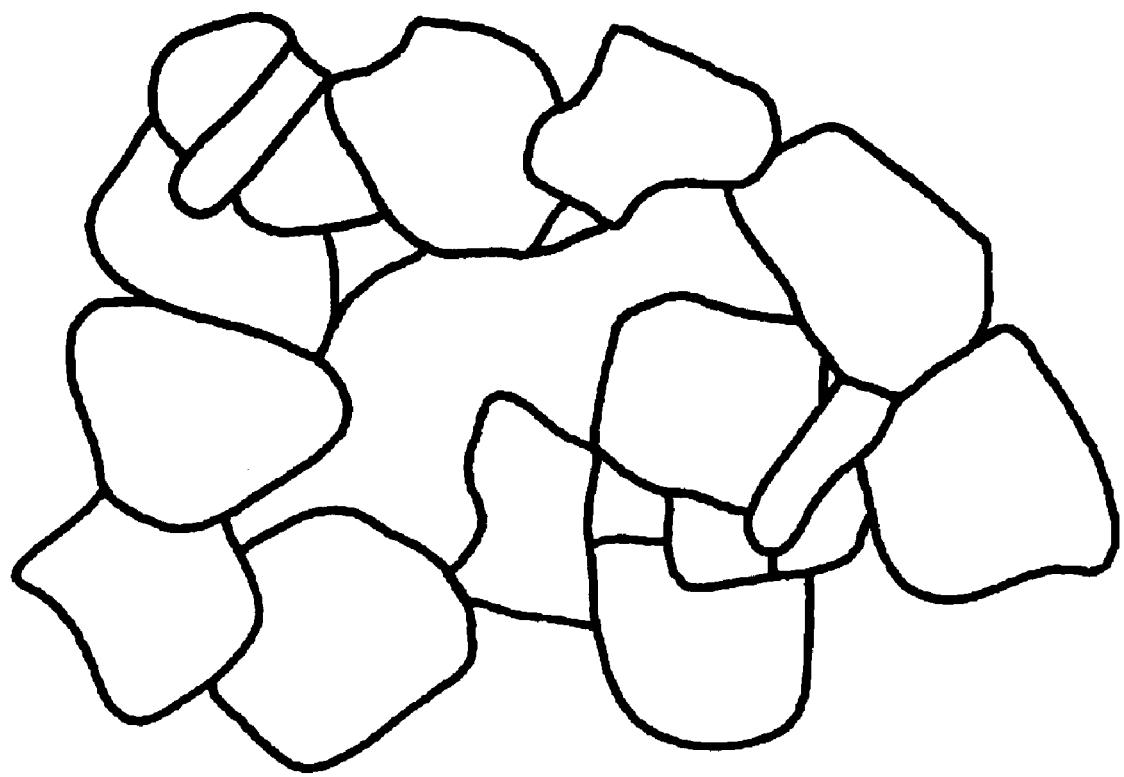
FIG. 2 is a diagram of the interlocked formation of the expanded Perlite in accordance with the present invention.

For illustration purposes, a magnified photograph of the expanded Perlite is presented in FIG. 2.

The expanded Perlite irregularly shaped particles offer an advantage over conventional microspheres. In a composite material, microspheres provide minimum contact with each other and will tend to "roll" over one another when a load is applied. This results in a minimum resistance to deformation. On the other hand, the irregularly shaped expanded Perlite tend to "interlock" and thus provide resistance to deformation under load since they act as a "cluster" of bodies. This interlocked mechanism is depicted in FIG. 2.

The expanded Perlite is available in particle densities ranging from about 0.18 g/cm³ to about 0.30 g/cm³. The particle size range for expanded Perlite is from about 1 micron to about 300 microns. The surface pH of the expanded Perlite is 7.0 and is therefore, neutral.

The compositions of the invention are comprised of at least two components, the vehicle/matrix phase and the included expanded Perlite phase. While the formulation ratios can vary widely, the preferred level of expanded Perlite in the composition, by weight percent, ranges from about 5% to about 30%. More preferably, the weight percent of expanded Perlite in the composition ranges from about 20% to about 25%.

In one preferred embodiment of this invention, the surface characteristics of the expanded Perlite are altered to improve the adhesion between the vehicle phase and the expanded Perlite included phase. Expanded Perlite is essentially a glass and as such has an abundance of silanol (Si—OH) groups on the surface that are reactive sites for coupling with organosilanes.

The general formula of an organosilane shows the two classes of functionality that is inherent $R_nSiX_{(4-n)}$ Where:

X is a hydrolyzable group, typically halogen, alkoxy, acyloxy or amine

R is a non-hydrolyzable organic radical

The silane coupling agent is placed in an aqueous or alcohol solution and applied to the expanded Perlite. Initially, the silane coupling agent will hydrolyze to form a reactive silanol group. This reactive silanol group will then condense with a silanol group on the surface of the expanded Perlite to form a stable siloxane linkage.

$R_n\text{—}SiX_{(4-n)}+H_2O\rightarrow R_nSiOH_{(4-n)}+(4-n)HX$

And

Coupling agent—SiOH+HOSi-expanded Perlite

The final result of reacting an organosilane with the expanded Perlite ranges from altering the wetting or adhesion characteristics of the expanded Perlite to providing specific groups for direct interaction with the vehicle or matrix phase.

In one illustration, the surface of the expanded Perlite is treated with n-octadecyltri-methoxy silane $CH_3(CH_2)_{17}Si\text{—}(OCH_3)_3$ To provide a surface with n-octadecyl groups

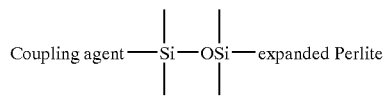

When placed in a paraffinic vehicle, such as mineral oil, the vehicle phase can interact with the surface treated expanded Perlite through Hydrogen bonding. The enhanced bonding between the vehicle and the expanded Perlite will result in improved ability of the composition to distribute applied loads as well as improved compatibility and resistance to separation.

In a second illustration the surface of the expanded Perlite is treated with 3-aminopropyltrimethoxysilane $H_2N\text{—}CH_2CH_2CH_2\text{—}Si\text{—}(OCH_3)_3$ To provide a surface with functional amine groups

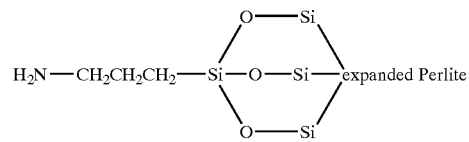

When placed in an aqueous vehicle containing a polymeric viscosifier containing acrylic acid groups, such as a copolymer of acrylamide and acrylic acid, an electrostatic interaction will occur between the polymer bound acrylic acid groups and the surface treated expanded Perlite.

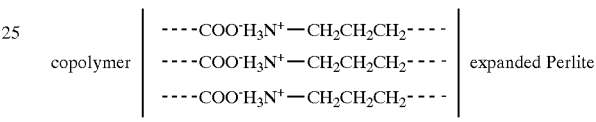

This electrostatic bonding of a vehicle component to the surface treated expanded Perlite will result in unique rheological, as well as mechanical, properties.

In a third illustration, the surface of the expanded Perlite is treated with a 3-acryloxypropyltrimethoxysilane

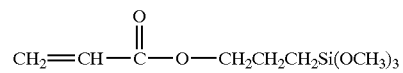

To provide a surface with vinyl functionality

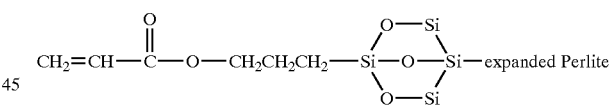

The surface treated expanded Perlite is placed in an aqueous vehicle containing a reactive monomer, such as acrylamide, and a water soluble free radical initiator. A thermal polymerization is then carried out to produce composite material containing free polyacrylamide as a viscosifier, and expanded Perlite with polyacrylamide grafted to the surface.

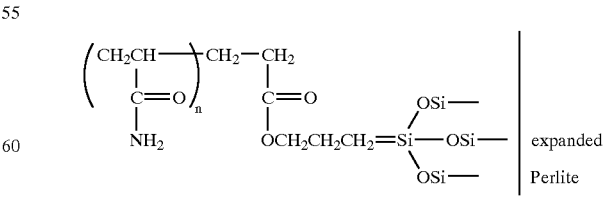

The surface grafted polymer on the expanded Perlite will result in a composite material with unique Theological as well as mechanical properties. The illustrations presented here are provided to demonstrate the utility of silane treated expanded Perlite in the practice of the invention and in no way is intended to limit the scope of this invention.

In another preferred embodiment of the invention, an additive with both hydrophobic and hydrophilic characteristics is added to the composition to function as a surface modifying agent. To illustrate this feature, an alkyl carboxylic acid, such as stearic acid, is added to the composition to act as a bonding agent.

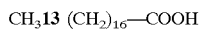

$$CH_3 13\ (CH_2)_{16}\text{—}COOH$$

The carboxylic acid portion of the stearic acid will attach to the polar surface of the expanded Perlite through electrostatic bonding. The $C_{12}$ hydrocarbon portion of the stearic acid is oriented in such a manner that the surface of the expanded Perlite is now non-polar. The hydrocarbon chain on the surface of the expanded Perlite is compatible with the paraffinic vehicle. The hydrophobic bonding created between the paraffinic vehicle and the surface bound hydrocarbon chains will result in better dispersion of the expanded Perlite in the paraffinic vehicle and improved compatibility with fewer tendencies for separation of components with the composite material.

The compositions of this invention can include additives to impart enhanced performance characteristics. Examples of such additives, without limitation, are as follows:

i. Rheology modifiers,
ii. Antioxidants,
iii. Buffers,
iv. Anti-mirobials,
v. Surfactants,
vi. Flame retardants,
vii. Colorants Rheology Modifiers—Additives that alter the viscosity and flow properties of liquid. These additives can have the effect of decreasing or increasing the viscosity of the liquid as a functional of increasing shear rate. The compositions of the invention may include a rheology modifier to promote certain properties such as response to the rate of applied load and the ability to resist deformation under an applied load.

For compositions where the vehicle is a paraffinic block copolymer of the A-B and A-B-A type can be utilized to tailor theological properties. Examples of these block copolymers would include ethylene/propylene rubber, styrene/isoprene rubber in either the A-B or A-B-A form. Other rheology modifiers are fatty amide, poly-B-pimene and waxes such as microcrystalline wax.

For compositions where the vehicle is aqueous based, associative thickeners may be employed. Examples of associative thickeners include hydrophobically modified cellulose, and block copolymers such as polyethylene oxide/polypropylene oxide sold by BASF under the trade names Pluronics® and Tetronics®.

Antioxidants—Antioxidants protect organic materials against thermal degradation during processing, which requires or generates heat. In addition, antioxidants provide long term protection against free radicals. A preferred antioxidant inhibits thermo-oxidative degradation of the material or compound to which it is added, providing long term resistance to polymer degradation. Preferably, an antioxidant added to the preferred gel cushioning medium is useful in a variety of applications.

Heat, light (in the form of high energy radiation), mechanical stress, catalyst residues and reaction of a material with impurities, all cause oxidation of the material. In the process of oxidation, highly reactive molecules, known as free radicals are formed and react to the presence of oxygen to form peroxy free radicals, which further react with organic material (hydrocarbon molecules) to form hydroperoxides.

The two major classes of antioxidants are the primary antioxidants and the secondary antioxidants. Peroxy free radicals are more likely to react with primary antioxidants than with other hydrocarbons. In the absence of a primary antioxidant, a peroxy free radical would break a hydrocarbon chain. Thus, primary antioxidants deactivate a peroxy free radical before it has a chance to attack and oxidize organic material.

Most primary antioxidants are known as sterically hindered phenols. One example of sterically hindered phenol is the C73H108O12 marketed by Ciba-Geigy as IRGANOX® 1010, which has the chemical name 3,5-bis(1,1-dimethylethyl)-4-hydroxybenzenepropanoic acid, 2,2-bis{[3-[3,5-bis(dimethylethyl)-4-hydroxyphenyl]-1-oxopropoxy]methyl}1,3-propanediyl ester. The FDA refers to IRGANOX® 1010 as tetrakis[methylene(3,5-di-trt-butyl-4-hydroxyhydrocinnimate)]methane. Other hindered phenols are also useful as primary antioxidants.

Similarly, secondary antioxidants react more rapidly with hydroperoxides than most other hydrocarbon molecules. Secondary antioxidants have been referred to as hydroperoxide decomposers. Thus, secondary antioxidants protect organic materials from oxidative degradation by hydroperoxides. Commonly used secondary antioxidants include chemical classes of phosphites/phosphonites and thioesters. It is known in the art that primary and secondary antioxidants form synergistic combinations to ward off attacks from both peroxy free radicals and hydroperoxides.

Buffers—In aqueous based systems, pH is an important property. In general neutral pH, pH=7.0, is desired in aqueous based systems to minimize hydrolysis of dissolved components such as water soluble polymer. Standard buffer systems, such as phosphates and borates, are available to adjust pH to 7.0 and to maintain that pH over time.

Antimicrobials—Compositions of this invention may require the use of an antimicrobial as a preservative to assure that no microbial growth will occur. This is especially true for aqueous based systems where problems of microbial growth often occur. Commercially there is a multitude of microbial growth agents available. Some are best suited for aqueous systems, while others are best suited for non-aqueous systems.

Surfactants—Surfactants may be employed in the practice of this invention to alter the interfacial surface tension between the vehicle and the expanded Perlite. Modification of flow behavior and compatibility of composition components can result from the addition of surfactants. Suitable surfactants can be chosen from among neutral surfactants, amphoteric surfactants and cationic surfactants.

Flame retardants—Flame retardants may be added to the composition of this invention in which the vehicle phase is a paraffinic fluid. Flame retardants generally work in, one of four ways; (1) they interfere with flame chemistry in the solid phase, (2) they interfere with flame chemistry in the gas phase, (3) they absorb heat, or (4) they displace oxygen. There are a number of suitable flame retarding systems that are commercially available. They include halogynated compounds, borates, phosphates and antrimony oxide to name a few.

Colorants—It may be desirable to add colorants to the compositions of this invention. There are many commercially available dyes, both water soluble and oil soluble, and pigments that can be used.

The lightweight compositions of the present invention are preferably prepared in the following manner. Initially, the vehicle phase is prepared which may be simply adding a fluid to the mixing chamber. In cases where two or more fluids are utilized or a high molecular weight component, such as a polymer, is added, then mixing of these components is required. This can be accomplished by mixing at room temperature or elevated temperature, generally less than 100° C. Once the vehicle phase is homogeneous, the Perlite is added and thoroughly mixed with the vehicle. The composite material is produced with a low shear mixing device such as a dough mixer or a ribbon blender.

A bladder or "envelope" is often utilized to confine the composite material of this invention. The bladder may be fabricated from any flexible film like material that is inert to the composition itself and or its individual components. Useful films include: polyurethane, polyvinyl chloride and polyolefins. Preferably, the material used to construct the bladder will be heat or radio frequency sealed able to provide a substantially impervious seal, which prevents leakage of composite material. It is also important that the bladder material be durable and retains its flexible, pliable properties over a useful temperature range for extended periods of time. A typical bladder may be constructed with flexible thermoplastic film such as PVC, Thermoplastic Polyurethane and coated polyolefin film such as Covelle® (Dow). A typical bladder can be constructed from the previously mentioned film in thickness of 3 mil to as thick as 50 mil.

Two pieces of the desired thermoplastic film are cut into a square shape approximately ¼" greater in size than the final size desired. One piece is placed on top of the other. A brass sealing die is constructed in the proper dimensions of the finished bladder. This die can have shapes of various degrees of complexity. For the sake of this example the basic shape is a rectangle approximately 4 inches wide and 6 inches long and contains a narrow extension of approximately 2 inches extending approximately 1 inch beyond the narrow end. This gives the die (and the resultant bladder) the approximate shape of a bottle with a 1-inch neck. The two pieces of stacked film are placed on the bed of a RF sealing machine, the tool or dies is carefully placed on the stacked film, covered with an insulator and the power applied. This results in producing a two dimensional flat bladder with a 1 inch neck through witch the cushioning material of this invention can be filled.

The cushioning material is then pumped into the bladder to the desired quantity, excess air is removed by gentle squeezing action and the filled bladder is placed back on the RF Sealing machine. A straight brass blade is placed across the opening of the neck and sufficient current is applied to weld a seal at the proper place along the neck.

The result is a 4-inch by 6-inch bladder filled with a light weight compositions of this invention. This filled bladder or a number of filled bladders attached together can be employed in cushioning applications for small surfaces such as surgical pads to larger surfaces for cushioning and pressure reduction in mattress and seating applications.

The following examples will serve to illustrate the practice of this invention. It is understood these examples are set forth merely for illustrative purposes and many other compositions are within the scope of the present invention. Those skilled in the art will recognize that the compositions containing other quantities of material and different species of the required materials may be similarly prepared. The following table describes the formulations set forth in the examples.

| FORMULATION MATERIALS | |
| --- | --- |
| CODE | DESCRIPTION |
| PB 450 | Polybutene of molecular weight 450 |
| SILCELL 32 | Hydrophobic expanded Perlite |
| SILCELL 32 BC | Hydrophilic expanded Perlite |
| HEC | Hydroxyethylenecellulose |
| MC | Methyl cellulose |
| UKH 5 | Chemically modified starch |
| SAP | Super absorbant polymer (BASF) |

EXAMPLE 1

The following example details the process for producing the composite materials of the invention. To a low shear mixer, such as a dough mixer or a ribbon blender, add the vehicle fluid either at room temperature or at a temperature up to about 100° C. Vehicle additives such as polymers or lower molecular weight species are added with mixing until completely dissolved or dispersed. The expanded Perlite is added at this point and mixing continued until the expanded, Perlite is completely dispersed. The resulting composite material is then stored until use.

EXAMPLE 2

This example illustrates the practice of the invention utilizing a polybutene vehicle phase and a hydrophobically treated expanded Perlite stearic acid as the bonding agent. The following formulations, in grams, were prepared by the method outlined in Example 1.

| FORMULATION | A | B | C |
| --- | --- | --- | --- |
| PB450 | 100 | 90 | 64 |
| SILCELL 32 | 30 | 30 | 30 |
| DENSITY, grams/cc | 0.45 | 0.42 | 0.36 |

Sample A and B were of a soft consistency, while Sample C was of a dough like consistency.

EXAMPLE 3

This example illustrates the practice of this invention utilizing a Hydroxyethyl cellulose thickened aqueous vehicle phase and both hydrophilic and hydrophobic expanded Perlite. The following formulations, in grams, were prepared by the method outlined in Example 1.

| FORMULATION | A | B | C |
| --- | --- | --- | --- |
| WATER | 77 | 77 | 73 |
| HEC | 3 | 3 | 3 |
| SILCELL 32 | 20 | — | 20 |
| SILCELL 32 BC | — | 20 | — |
| DENSITY, grams/cc | 0.53 | 0.54 | 0.48 |

All Samples were of a soft consistency and extremely pliable.

EXAMPLE 4

This example illustrates the practice of this invention utilizing a methylcellulose thickened aqueous vehicle phase and an expanded Perlite. The following formulations, in grams, were prepared by the method outlined in Example 1.

| FORMULATION MATERIALS | |
|---|---|
| CODE | DESCRIPTION |
| PB 450 | Polybutene of molecular weight 450 |
| SILCELL 32 | Hydrophobic expanded Perlite |
| SILCELL 32 BC | Hydrophilic expanded Perlite |
| HEC | Hydroxyethylcellulose |
| MC | Methyl cellulose |
| UKH 5 | Chemically modified starch |
| SAP | Super absorbant polymer (BASF) |

All of the Samples were of soft consistency and quite pliable.

EXAMPLE 5

This example illustrates the practice of this invention utilizing a chemically modified starch thickened aqueous vehicle phase and an expanded Perlite. The following formulations, in grams, were prepared by the method outlined in Example 1.

| FORMULATION | A | B |
|---|---|---|
| WATER | 774 | 750 |
| UKH 5 | 16 | 10 |
| SILCELL 32 | 210 | 210 |
| DENSITY, grams/cc | 0.56 | 0.49 |

Samples A and B were of soft consistency and quite pliable. Sample A was slightly softer than Sample B.

What is claimed is:

1. A composite material suitable for use in cushioning and padding applications comprising:

a. A matrix phase;

b. An included phase, wherein said matrix phase is a fluid ranging in viscosity from about 200 cps to about 20,000 cps, and said included phase is expanded Perlite, an irregularly shaped, multi-cellular sodium potassium aluminum silicate particle ranging from about 1 micron to about 500 microns wherein said matrix phase is bonded to or adhered to said included phase.

2. The composite material of claim 1, wherein said matrix phase is selected from the group consisting of polglycols, polyalphaolefins, mineral oils, polysiobutylene and poly-1-butene.

3. The composite material of claim 1, wherein said expanded Perline has a density from about 0.18 gm/cm$^3$ to about 0.30 gm/cm$^3$.

* * * * *